(12) United States Patent
Kim (10) Patent No.: US 11,916,460 B2
(45) Date of Patent: Feb. 27, 2024

(54) MOTOR WITH TERMINAL PART LEGS CONTACTING THE HOUSING

(71) Applicant: LG INNOTEK CO., LTD., Seoul (KR)

(72) Inventor: Se Jong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 423 days.

(21) Appl. No.: 17/419,103

(22) PCT Filed: Dec. 27, 2019

(86) PCT No.: PCT/KR2019/018540
§ 371 (c)(1),
(2) Date: Jun. 28, 2021

(87) PCT Pub. No.: WO2020/138989
PCT Pub. Date: Jul. 2, 2020

(65) Prior Publication Data
US 2022/0123623 A1    Apr. 21, 2022

(30) Foreign Application Priority Data

Dec. 27, 2018 (KR) .................. 10-2018-0170458

(51) Int. Cl.
*H02K 5/22* (2006.01)
*H02K 7/00* (2006.01)

(52) U.S. Cl.
CPC ............. *H02K 5/225* (2013.01); *H02K 7/003* (2013.01); *H02K 2203/09* (2013.01)

(58) Field of Classification Search
CPC ....... H02K 5/22; H02K 5/225; H02K 2203/09
See application file for complete search history.

(56) References Cited

U.S. PATENT DOCUMENTS

2007/0178723 A1    8/2007  Kataoka et al.
2012/0126646 A1*   5/2012  Nakagawa ............. H02K 5/225
                                                      310/71

(Continued)

FOREIGN PATENT DOCUMENTS

DE    10 2013 211 968 A1    1/2015
DE       102017202860 A1 *  8/2017  ............... H02K 3/50

(Continued)

OTHER PUBLICATIONS

Yao, Machine Translation of DE102017202860, Aug. 2017 (Year: 2017).*

(Continued)

*Primary Examiner* — Eric Johnson
(74) *Attorney, Agent, or Firm* — Saliwanchik, Lloyd & Eisenschenk (57) ABSTRACT

The present invention may provide a motor including a housing, a stator busbar, and a terminal part connected to the busbar, wherein the busbar includes a first terminal, the terminal part includes a terminal body and a second terminal connected to the first terminal, the terminal body includes a body disposed to be spaced apart from an upper end of the housing and legs which extend from the body and are in contact with the housing, a width of each of the legs in a circumferential direction is smaller than a width of the body in the circumferential direction, the first end portion is disposed between the rotor and an inner circumferential surface of the housing in a radial direction, and the second end portion is disposed between a lower surface of the body and the upper end of the housing in an axial direction.

10 Claims, 7 Drawing Sheets

(56) References Cited

U.S. PATENT DOCUMENTS

| | | |
|---|---|---|
| 2018/0123414 A1 | 5/2018 | Kim |
| 2018/0233984 A1 | 8/2018 | Ogawa et al. |
| 2020/0313501 A1* | 10/2020 | Asahi ..................... H02K 3/50 |
| 2022/0393545 A1* | 12/2022 | Shin ...................... H02K 5/15 |

FOREIGN PATENT DOCUMENTS

| | | |
|---|---|---|
| EP | 3 154 162 A1 | 4/2017 |
| KR | 10-0270950 B1 | 11/2000 |
| KR | 10-2013-0061283 A | 6/2013 |
| KR | 10-2016-0043670 A | 4/2016 |
| KR | 10-2017-0032663 A | 3/2017 |
| KR | 10-2017-0052980 A | 5/2017 |
| WO | WO-2019142792 A1 * | 7/2019 |

OTHER PUBLICATIONS

Noboru, Machine Translation of WO2019142792, Jul. 2019 (Year: 2019).*

Supplementary European Search Report dated Jan. 5, 2022 in European Application No. 19906507.9.

International Search Report dated Apr. 8, 2020 in International Application No. PCT/KR2019/018540.

* cited by examiner

MOTOR WITH TERMINAL PART LEGS CONTACTING THE HOUSING

CROSS-REFERENCE TO RELATED APPLICATIONS

This application is the U.S. national stage application of International Patent Application No. PCT/KR2019/018540, filed Dec. 27, 2019, which claims the benefit under 35 U.S.C. § 119 of Korean Application No. 10-2018-0170458, filed Dec. 27, 2018, the disclosures of each of which are incorporated herein by reference in their entirety.

TECHNICAL FIELD

An embodiment relates to a motor.

BACKGROUND ART

A motor includes a rotor and a stator. The rotor is coupled to a shaft. When the rotor rotates, the shaft rotates in conjunction with the rotation of the rotor. The stator may include a coil. The divided coil is connected by a busbar. The busbar is connected to a terminal part connected to an external power source. The terminal part includes a terminal body and a terminal included in the terminal body. A terminal of the busbar and the terminal of the terminal part are fused and connected. In addition, the terminal of the terminal part may be connected to a controller.

In this case, with the terminal body, an end of the terminal connected to the controller is disposed outside the busbar based on a radial direction of the motor in order to secure a fusing space of the terminal of the busbar and the terminal of the terminal part. Accordingly, there is a problem increasing a thickness of an application (for example, a steering apparatus) to which the motor is applied.

Technical Problem

An embodiment is directed to providing a motor in which a distance between a shaft and a terminal of a terminal part in a radial direction is reduced to allow a thickness of an application to be reduced.

Objectives to be solved by the embodiment are not limited to the above-described objectives, and other objectives which are not described above will be clearly understood by those skilled in the art from the following specification.

Technical Solution

An embodiment provides a motor including a housing, a stator disposed in the housing, a rotor disposed in the stator, a shaft coupled to the rotor, a busbar disposed above the stator, and a terminal part connected to the busbar, wherein the busbar includes a busbar body and a first terminal disposed at the busbar body, the terminal part includes a terminal body and a second terminal disposed at the terminal body and connected to the first terminal, the terminal body includes a body disposed to be spaced apart from an upper end of the housing and legs which extend from the body and are in contact with the housing, a width of each of the legs in a circumferential direction is smaller than a width of the body in the circumferential direction, the second terminal includes a first end portion exposed upward from the body and a second end portion exposed downward from the body and connected to the first terminal, the first end portion is disposed between the rotor and an inner circumferential surface of the housing in a radial direction, and the second end portion is disposed between a lower surface of the body and the upper end of the housing in an axial direction.

An embodiment provides a motor including a housing, a stator disposed in the housing, a rotor disposed in the stator, a shaft coupled to the rotor, a busbar disposed above the stator, and a terminal part connected to the busbar, wherein the busbar includes a busbar body and a plurality of first terminals disposed at the busbar body, the terminal part includes a terminal body and a plurality of second terminals disposed at the terminal body and connected to the first terminals, the terminal body includes an opening passing through an inner surface and an outer surface of the terminal body, a part of the second terminal is disposed in the opening, and at least a part of the terminal body overlaps the busbar body in an axial direction.

An embodiment provides a motor including a housing, a stator disposed in the housing, a rotor disposed in the stator, a shaft coupled to the rotor, a busbar disposed above the stator, and a terminal part connected to the busbar, wherein the busbar includes a busbar body and a plurality of first terminals disposed at the busbar body, the terminal part includes a terminal body and a plurality of second terminals disposed at the terminal body and connected to the first terminals, each of the second terminals includes a first end portion and a second end portion connected to the first terminal, a part of the terminal body is in contact with the housing, the first end portion and the second end portion are disposed between an inner circumferential surface and an outer circumferential surface of the busbar body in a radial direction, and the second end portion is disposed outside the terminal body.

A lower surface of the terminal body may include a first surface and a second surface, and the first surface may be in contact with an upper surface of the housing and the second surface may be disposed higher than the upper surface of the housing.

A lower surface of the terminal body may further include a third surface, and the third surface may be disposed lower than the upper surface of the housing.

The second surface may be disposed higher than the first terminal.

The housing may include a first coupling part disposed on the upper surface, and the first surface may include a second coupling part coupled to the first coupling part.

The first end portion may be disposed between an inner circumferential surface of the busbar body and the inner circumferential surface of the housing in the radial direction.

A width of each of the legs in the radial direction may be smaller than a width of the body in the radial direction.

The widths of the plurality of legs in the circumferential direction may be different, and at least one of the plurality of second end portions may be disposed between the legs based on the circumferential direction.

Advantageous Effects

According to an embodiment, an advantageous effect of reducing a thickness of an application by reducing a distance between a shaft and a terminal of a terminal part in a radial direction is provided.

According to an embodiment, an advantageous effect of simplifying a fusing process of a terminal of a busbar and the terminal of the terminal part is provided.

MODES OF THE INVENTION

Hereinafter, exemplary embodiments of the present invention will be described in detail with reference to the accompanying drawings.

However, the technical spirit of the present invention is not limited to some embodiments which will be described and may be realized using in a variety of different forms, and one or more components of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Figure 1:
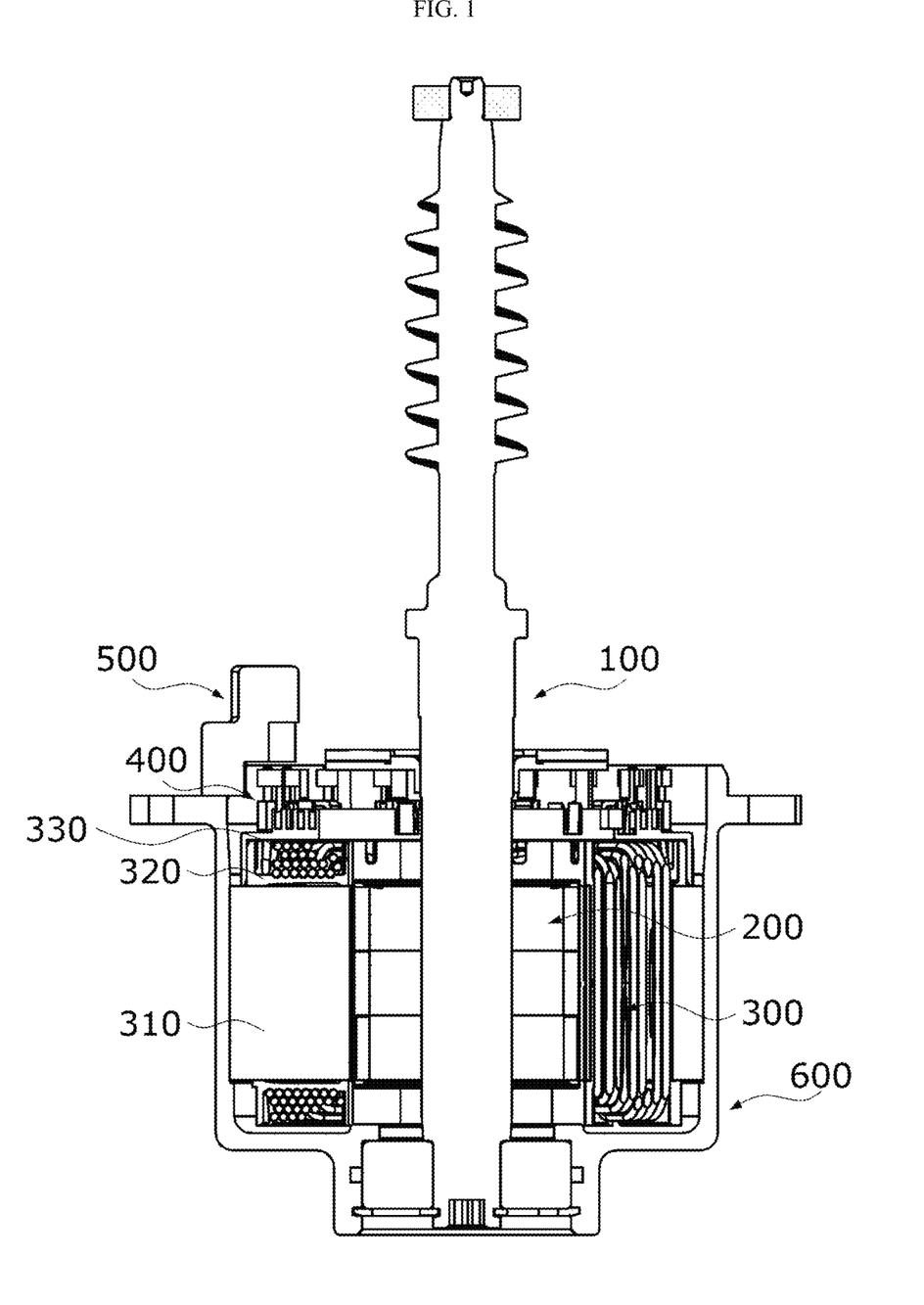
FIG. 1 is a view illustrating a motor according to an embodiment.

FIG. 1 is a view illustrating a motor according to an embodiment. Referring to FIG. 1, the motor according to the embodiment may include a shaft 100, a rotor 200, a stator 300, a busbar 400, a terminal part 500, and a housing 600.

The stator 300 is disposed in the housing 600. The rotor 200 is disposed in the stator 300. In addition, the rotor 200 is disposed outside the shaft 100. In this case, the term "inside" denotes a direction toward the shaft 100 of the motor, and the term "outside" denotes a direction from the shaft 100 toward the housing 600, which is a direction opposite to the term "inside."

The shaft 100 may be coupled to the rotor 200. When an electromagnetic interaction occurs between the rotor 200 and the stator 300 through current supply, the rotor 200 rotates, and the shaft 100 rotates in conjunction with the rotation of the rotor 200. The shaft 100 may be connected to a steering apparatus of a vehicle to transmit power.

The rotor 200 rotates due to an electrical interaction with the stator 300.

The rotor 200 may be disposed inside the stator 300. The rotor 200 may include a rotor core and a magnet disposed on the rotor core.

The stator 300 is disposed outside the rotor 200. The stator 300 may include a stator core 310, an insulator 320 installed on the stator core 310, and coils 330 wound around the insulator 320. The coils 330 induce an electric interaction with the magnet of the rotor 200.

The busbar 400 is disposed above the stator 300. The busbar 400 connects the coils 330 wound around the insulator 320 of the stator 300.

The terminal part 500 is connected to the busbar 400. In addition, the terminal part 500 is connected to an external power source.

Figure 2:
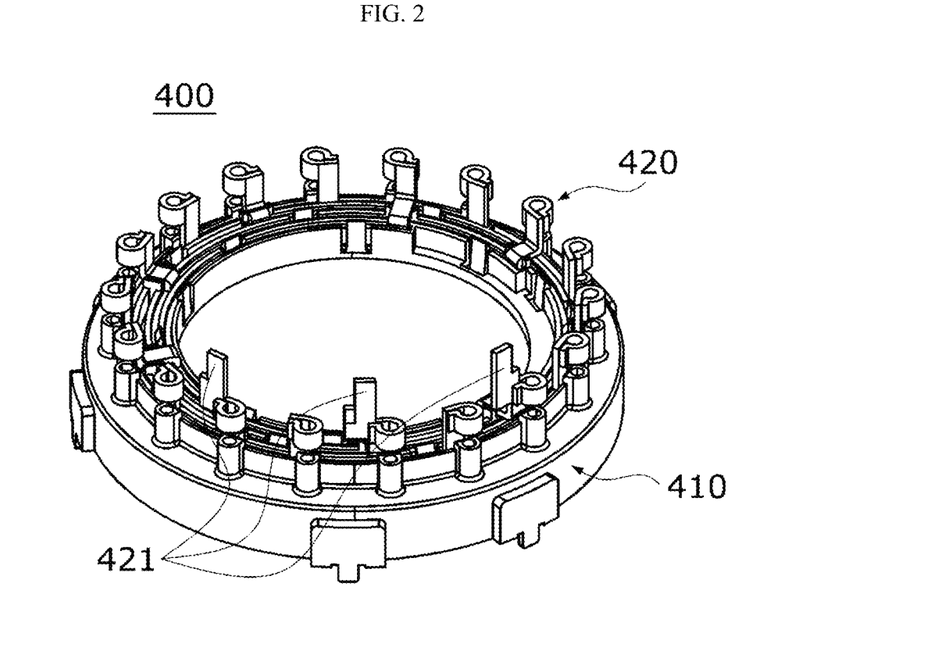
FIG. 2 is a view illustrating a busbar.

FIG. 2 is a view illustrating the busbar.

Referring to FIG. 2, the busbar 400 includes a busbar body 410 and a first terminal 420. The busbar body 410 may be an annular member having an inner circumferential surface and an outer circumferential surface. The first terminal 420 is disposed at the busbar body 410. The first terminal 420 may be provided as a plurality of first terminals 420. The first terminal 420 is connected to the coil 330 wound around the insulator 320 of the stator 300. In addition, the first terminal 420 is connected to the terminal part 500. A connecting end 421 of the first terminal 420 may be disposed to protrude upward from the busbar body 410. The connecting end 421 of the first terminal 420 is connected to the terminal part 500.

Figure 3:
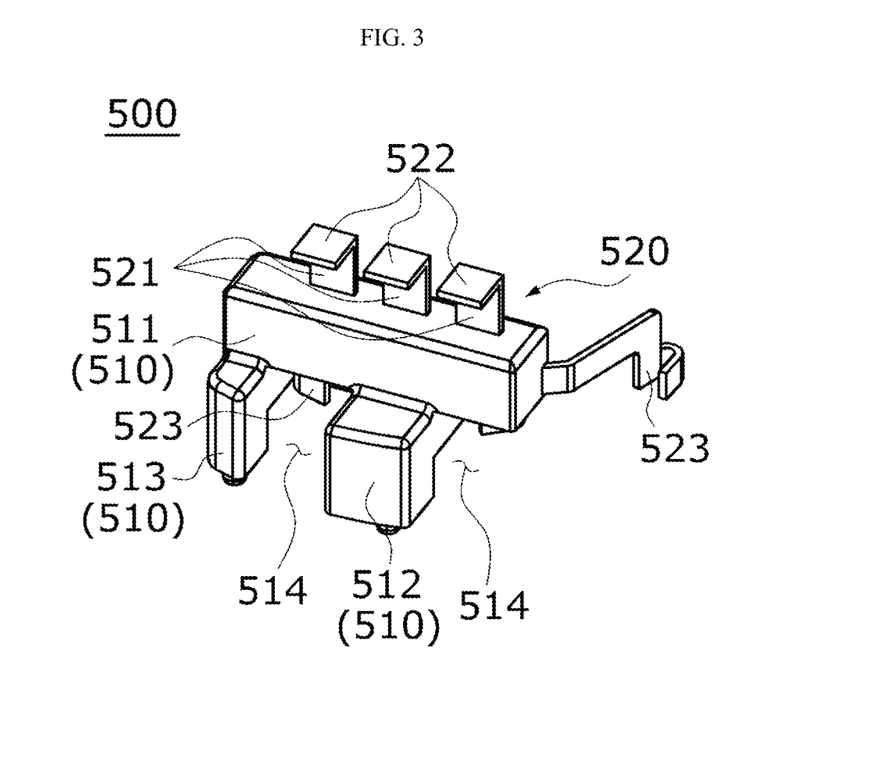
FIG. 3 is a perspective view of a terminal part.
Figure 4:
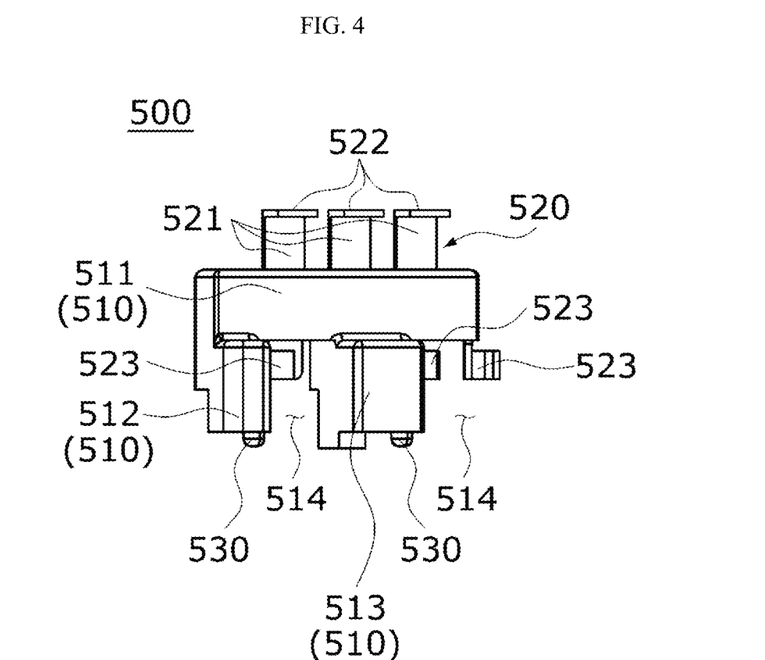
FIG. 4 is a front view of the terminal part.

FIG. 3 is a perspective view of the terminal part, and FIG. 4 is a front view of the terminal part.

Referring to FIGS. 3 and 4, the terminal part 500 includes a terminal body 510 and a second terminal 520.

The terminal body 510 may include a body 511 and legs 512 and 513. The second terminal 520 is disposed on the body 511. The legs 512 and 513 are disposed to extend from a lower surface of the body 511.

The second terminal 520 may include a central portion 521, a first end portion 522, and a second end portion 523. One region of the central portion 521 may be disposed inside the terminal body 510, and another region of the central portion 521 may be disposed outside the terminal body 510. The first end portion 522 is disposed at one end of the central portion 521 and formed to be bent from one end of the central portion 521. The second end portion 523 is disposed at the other end of the central portion 521 and formed to be bent from the other end of the central portion 521. The first end portion 522 is exposed upward from the body 511. In addition, the second end portion 523 is exposed downward from the body 511. The first end portion 522 is connected to a controller. The second end portion 523 is connected to the connecting end 421 of the first terminal 420 of the busbar 400.

The legs 512 and 513 may be provided as a plurality of legs 512 and 513. For example, the legs 512 and 513 may include a first leg 512 and a second leg 513. The first leg 512 and the second leg 513 are disposed to be spaced apart from each other to form a space therebetween. An opening 514 is disposed between the first leg 512 and the second leg 513. The opening 514 is disposed to pass through an inner surface and an outer surface of the terminal body 510. At least one of the plurality of second end portions 523 is disposed in the opening 514. The second end portion 523 is disposed between the lower surface of the body 511 and an upper end of the housing 600.

Figure 5:
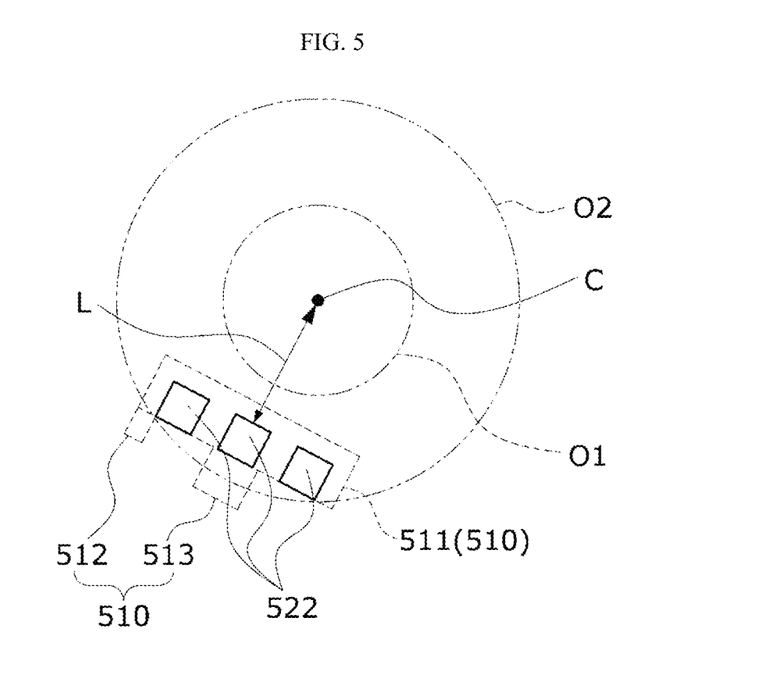
FIG. 5 is a view showing a position of a first end portion of a second terminal with respect to a rotor and a housing.

FIG. 5 is a view showing a position of the first end portion of the second terminal with respect to a rotor and a housing.

Referring to FIG. 5, a first distance L which is a minimum distance between the shaft 100 and the first end portion 522 of the second terminal 520 based on a radial direction affects a thickness of an application to which the motor is applied. Since the first end portion 522 is connected to the controller, a position of the first end portion 522 affects the position and size of the controller. Accordingly, in order to reduce the thickness of the application in which the motor is installed, the first distance L is preferably as short as possible.

The first end portion 522 may be disposed inside an inner circumferential surface of the housing 600 based on the radial direction. In FIG. 5, a first boundary O1 denotes an outer circumferential surface of the rotor. In addition, in FIG. 5, a second boundary O2 denotes the inner circumferential surface of the housing 600. The first end portion 522 may be disposed between the first boundary O1 and the second boundary O2 based on the radial direction. This is to reduce the first distance L, and the above-described structure is allowed by securing a fusing space of the second end portion 523 and the connecting end 421 through the opening 514.

Figure 6:
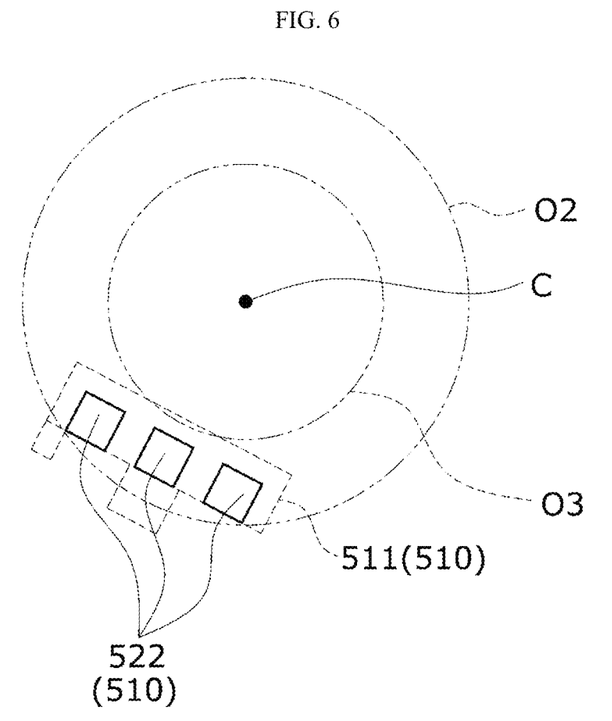
FIG. 6 is a view showing the position of the first end portion of the second terminal with respect to the busbar and the housing.

FIG. 6 is a view showing the position of the first end portion of the second terminal with respect to the busbar and the housing.

Referring to FIG. 6, in FIG. 6, a third boundary O3 denotes the inner circumferential surface of the busbar body 410. The first end portion 522 may be disposed between the second boundary O2 and the third boundary O3 based on the radial direction. This is also to reduce the first distance L, and the above-described structure is allowed by securing the fusing space of the second end portion 523 and the connecting end 421 through the opening 514.

Figure 7:
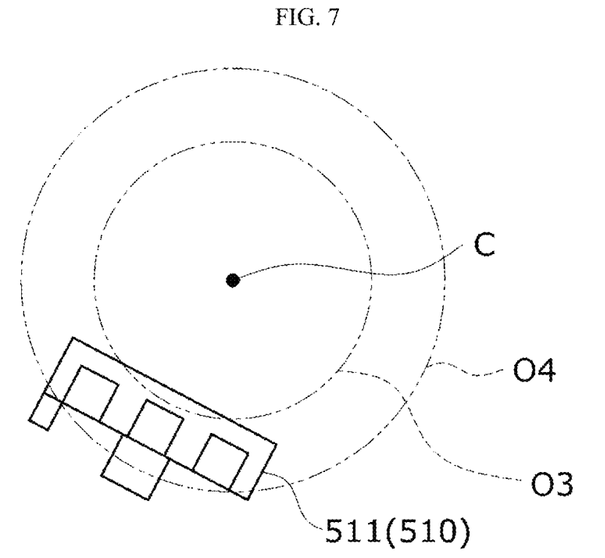
FIG. 7 is a view showing a position of a terminal body with respect to the busbar.

FIG. 7 is a view showing a position of the terminal body with respect to the busbar.

Referring to FIG. 7, at least a part of the terminal body 510 may be disposed to overlap the busbar body 410 in an axial direction. In FIG. 6, a fourth boundary O4 denotes the outer circumferential surface of the busbar body 410. At least a part of the terminal body 510 may be disposed between the third boundary O3 and the fourth boundary O4 based on the radial direction. This is also to reduce the first distance L, and the above-described structure is allowed by securing the fusing space through the opening 514.

Figure 8:
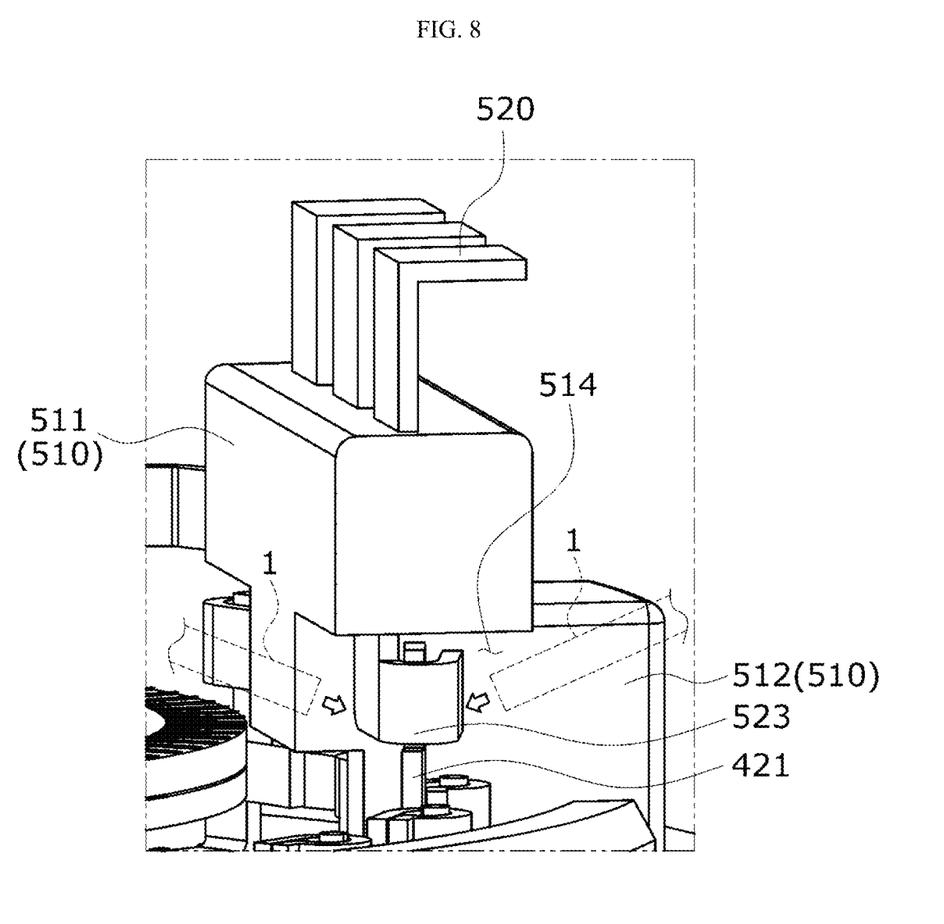
FIG. 8 is a side cross-sectional view of the terminal part.

FIG. 8 is a side cross-sectional view of the terminal part.

Referring to FIG. 8, the second end portion 523 of the second terminal 520 is disposed in the opening 514. In addition, the connecting end 421 of the first terminal 420 is disposed in the opening 514 to be aligned with the second end portion 523. The body 511 is disposed above the second end portion 523, and the first end portion 522 is positioned at an upper side of the body 511. Although the terminal body 510 and the first end portion 522 are positioned inside the inner circumferential surface of the housing 600, the fusing space of the second end portion 523 of the second terminal 520 and the connecting end 421 of the first terminal 420 may be secured through the opening 514. An apparatus for fusing enters from an outer side and an inner side of the opening 514 to fuse the second end portion 523 and the connecting end 421.

Figure 9:
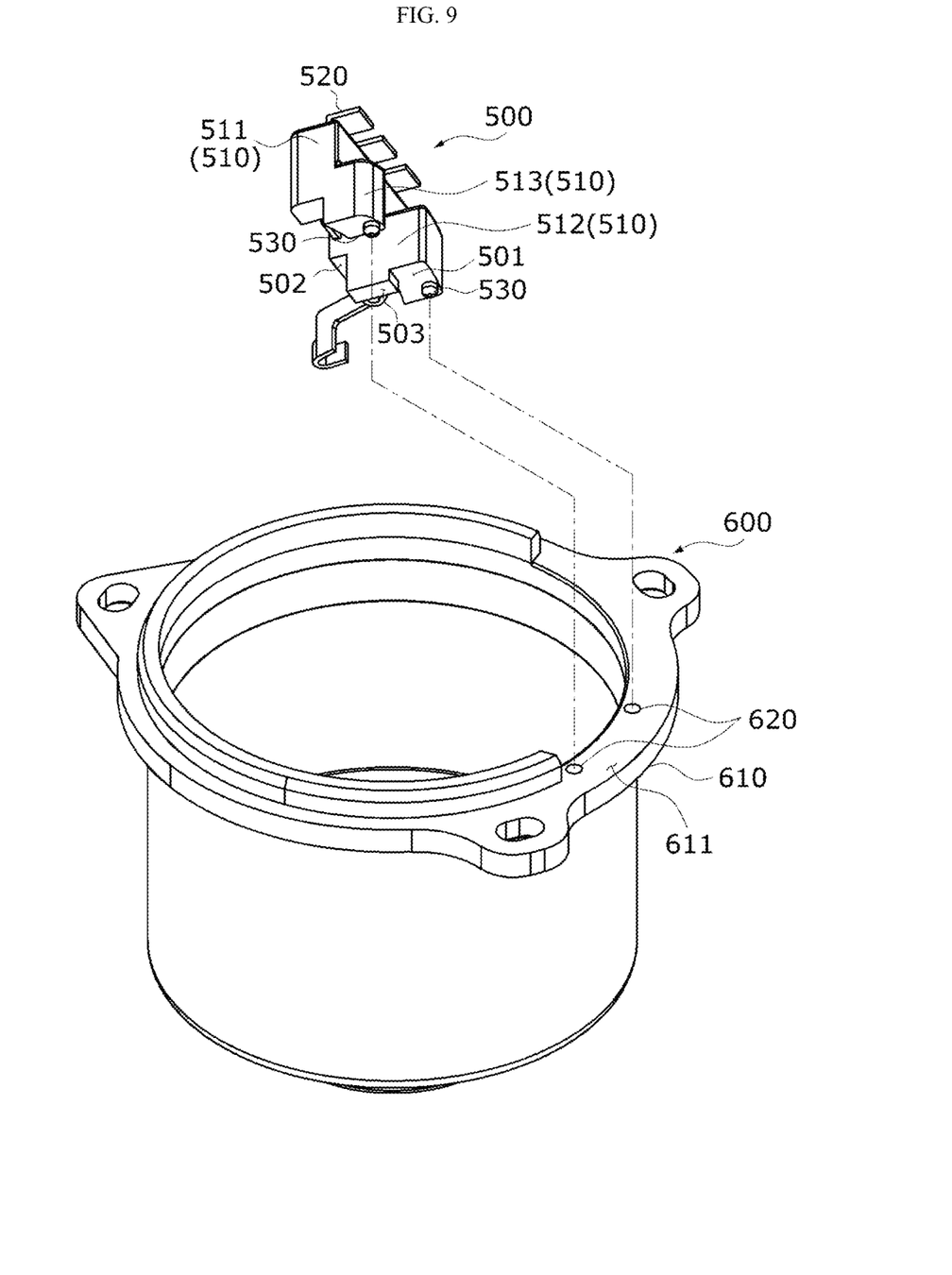
FIG. 9 is a view showing coupling of the housing and the terminal part.

FIG. 9 is a view showing coupling of the housing and the terminal part.

Referring to FIG. 9, a lower surface of the terminal body 510 includes a first surface 501, a second surface 502, and a third surface 503. The first surface 501 may be disposed outside the third surface 503. The second surface 502 may be disposed inside the third surface 503. A first coupling part 530 may be disposed on the first surface 501. In addition, the first surface 501, the second surface 502, and the third surface 503 may be lower surfaces of the legs 512 and 513. The lower surfaces of the legs 512 and 513 may include the first surface 501 and the second surface 502 disposed above the first surface 501 to have steps having different heights from each other. In addition, unlike the second leg 513, the lower surface of the first leg 512 may include the third surface 503 disposed under the first surface 501. The first coupling part 530 may be a protrusion protruding from the first surface 501. The housing 600 includes a flange 610. The flange 610 may include a second coupling part 620. The second coupling part 620 may be a hole or groove disposed in the flange 610. The second coupling part 620 is coupled to the first coupling part 530. The first surface 501 may also be in contact with an upper surface 611 of the flange 610.

Figure 10:
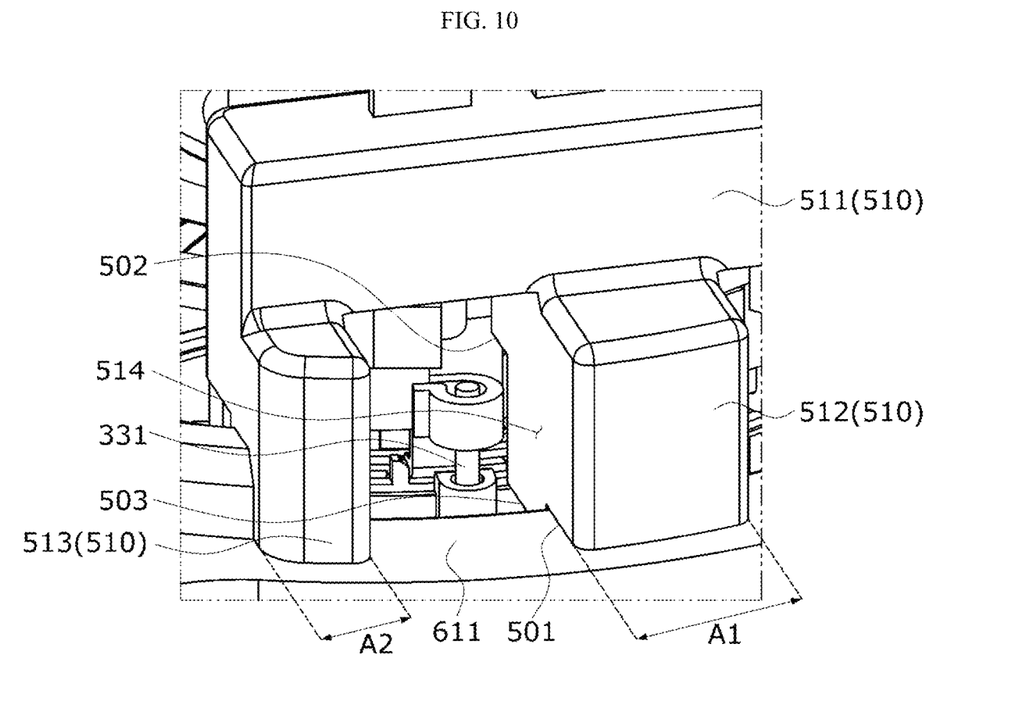
FIG. 10 is an enlarged perspective view of an opening.

FIG. 10 is an enlarged perspective view of an opening.

Referring to FIGS. 9 and 10, the second surface 502 is disposed higher than the upper surface 611 of the flange 610. In addition, the second surface 502 may be disposed higher than the connecting end 421 of the coil 330. This is to avoid interference between the connecting end 421 of the coil 330 and the legs 512 and 513. The third surface 503 is disposed lower than the upper surface 611 of the flange 610. This is to secure structural safety and a coupling force of the terminal body 510 when the terminal body 510 and the housing 600 are coupled.

A width A1 of the first leg 512 in a circumferential direction may be greater than a width A2 of the second leg 513 in the circumferential direction.

Figure 11:
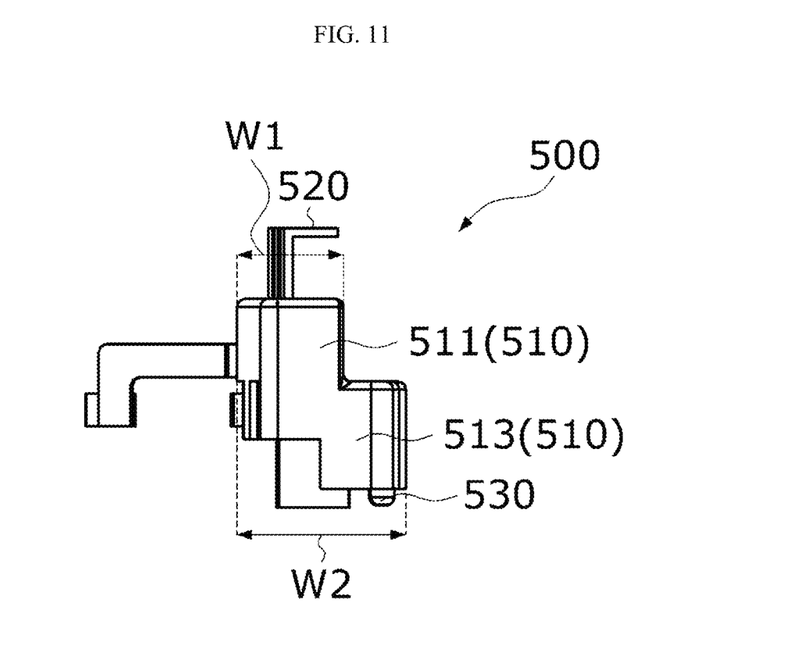
FIG. 11 is a side view of the terminal part.

FIG. 11 is a side view of the terminal part.

Referring to FIG. 11, in the terminal part 500, the legs 512 and 513 are disposed under the body 511, and the legs 512 and 513 may have shapes protruding outward from the body 511 in the radial direction. For example, a width W2 of each of the legs 512 and 513 in the radial direction may be greater than a width W1 of the body 511 in the radial direction. This is to consider a position of the second terminal 520 and positions of the legs 512 and 513 which fix the body 511 to the housing 600.

As described above, the motor according to one exemplary embodiment of the present invention has been specifically described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not to limit the technological scope. The technological scope of the present invention is not limited by the embodiments and the accompanying drawings. The scope of the present invention should be interpreted by the appended claims and encompass all equivalents falling within the scope of the appended claims.

The invention claimed is:

1. A motor comprising:
a housing;
a stator disposed in the housing;
a rotor disposed in the stator;
a shaft coupled to the rotor;
a busbar disposed above the stator; and
a terminal part connected to the busbar,
wherein the busbar includes a busbar body and a first terminal disposed at the busbar body,
the terminal part includes a terminal body and a second terminal disposed at the terminal body and connected to the first terminal,
the terminal body includes a body disposed to be spaced apart from an upper end of the housing and legs that extend from the body and are in contact with the housing,
a width of each of the legs in a circumferential direction is smaller than a width of the body in the circumferential direction,
the second terminal includes a first end portion exposed upward from the body and a second end portion exposed downward from the body and connected to the first terminal at a connecting end of the first terminal,
wherein the terminal body includes an opening passing through an inner surface and an outer surface of the terminal body,
the first end portion is disposed between an outer circumferential surface of the rotor and an inner circumferential surface of the housing in a radial direction,
the second end portion is disposed between a lower surface of the body and the upper end of the housing in an axial direction, and is disposed in the opening, and
the connecting end of the first terminal is disposed in the opening to be aligned with the second end portion so that a fusing space of the second end portion of the second terminal and the connecting end of the first terminal is secured through the opening.

2. The motor of claim 1, wherein:
at least a part of the terminal body overlaps the busbar body in an axial direction.

3. The motor of claim 1, wherein:
a part of the terminal body is in contact with the housing,
the first end portion and the second end portion are disposed between an inner circumferential surface and an outer circumferential surface of the busbar body in a radial direction, and
the second end portion is disposed outside the terminal body.

4. The motor of claim 1, wherein:
a lower surface of the terminal body includes a first surface and a second surface; and
the first surface is in contact with an upper surface of the housing, and the second surface is disposed higher than the upper surface of the housing.

5. The motor of claim 4, wherein:
the lower surface of the terminal body includes a third surface; and
the third surface is disposed lower than the upper surface of the housing.

6. The motor of claim 4, wherein the second surface is disposed higher than the first terminal.

7. The motor of claim 4, wherein:
the housing includes a first coupling part disposed on the upper surface; and
the first surface includes a second coupling part coupled to the first coupling part.

8. The motor of claim 1, wherein the first end portion is disposed between an inner circumferential surface of the busbar body and the inner circumferential surface of the housing in the radial direction.

9. The motor of claim 1, wherein a width of each of the legs in the radial direction is smaller than a width of the body in the radial direction.

10. The motor of claim 1, wherein:
the widths of each of the legs in the circumferential direction are different; and
the second end portion is disposed between the legs based on the circumferential direction.

* * * * *